US012200025B2

(12) United States Patent
Toohey et al.

(10) Patent No.: US 12,200,025 B2
(45) Date of Patent: Jan. 14, 2025

(54) REMOTE REALTIME INTERACTIVE NETWORK CONFERENCING

(71) Applicant: Excalibur AcquisitionCo, LLC, San Francisco, CA (US)

(72) Inventors: Matthew J. Toohey, Caulfield (AU); Mudit Saxena, Uttar Pradesh (IN); Naveen I. Pai, Goa (IN); Sanyam Jain, Uttar Pradesh (IN); Haresh Kannan, Tamil Nadu (IN); Aditya Tiwari, Madhya Pradesh (IN); Shailaja Nair, Chhattisgarh (IN); Shresth Sahai, Uttar Pradesh (IN)

(73) Assignee: Aktana, Inc., San Francisco, CA (US)

( * ) Notice: Subject to any disclaimer, the term of this patent is extended or adjusted under 35 U.S.C. 154(b) by 147 days.

(21) Appl. No.: 17/730,194

(22) Filed: Apr. 27, 2022

(65) Prior Publication Data

US 2023/0300180 A1     Sep. 21, 2023

(51) Int. Cl.
| | |
|---|---|
| H04N 7/15 | (2006.01) |
| H04L 65/1059 | (2022.01) |
| H04L 65/1069 | (2022.01) |
| H04L 65/403 | (2022.01) |
| H04N 7/14 | (2006.01) |

(52) U.S. Cl.
CPC ........ *H04L 65/403* (2013.01); *H04L 65/1059* (2013.01); *H04L 65/1069* (2013.01); *H04N 7/14* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 9,930,092 | B2 * | 3/2018 | Vegesna-Venkata | ....................... H04L 67/146 |
| 10,462,216 | B1 * | 10/2019 | Vysotsky | ............ H04L 67/1091 |
| 10,999,344 | B1 * | 5/2021 | Babkin | ................ H04L 65/403 |
| 2015/0106436 | A1 * | 4/2015 | Deyerle | ................ H04L 65/403 709/203 |

(Continued)

FOREIGN PATENT DOCUMENTS

WO    WO-2023177597 A2    9/2023

OTHER PUBLICATIONS

PCT International Search Report and Written Opinion, PCT Application No. PCT/US2023/15055, Sep. 20, 2023, 14 pages.

*Primary Examiner* — Quoc D Tran
(74) *Attorney, Agent, or Firm* — Wilson Sonsini Goodrich & Rosati

(57) ABSTRACT

A system for holding a network conferencing session may include a remote server and a presenter interface. The remote server may be configured to load a presentation material in a content renderer operated at the remote server and transmit video streams of the presentation material to remote client devices that are in the network conferencing session. The presenter interface may receive one of the video streams and display the presentation material based on data from the one of the video streams. The presenter interface may capture interactive events of a presenter directed at the presenter interface. The presenter interface may transmit the interactive events of the presenter to the remote server for remotely controlling the content renderer operating at the remote server using the interactive events directed at the presenter interface.

20 Claims, 10 Drawing Sheets

(56) References Cited

U.S. PATENT DOCUMENTS

| | | | |
|---|---|---|---|
| 2016/0173944 A1* | 6/2016 | Kilar | G06F 3/04886 |
| | | | 725/12 |
| 2016/0328204 A1* | 11/2016 | Sridhar | G06F 40/169 |
| 2017/0237788 A1* | 8/2017 | Xi | H04L 65/4015 |
| | | | 709/204 |
| 2019/0212968 A1 | 7/2019 | Walmsley et al. | |
| 2019/0236640 A1 | 8/2019 | Drake et al. | |
| 2021/0004096 A1* | 1/2021 | Momchilov | G06F 9/451 |
| 2023/0195290 A1* | 6/2023 | Taylor | G06F 9/451 |
| | | | 715/731 |

\* cited by examiner

FIG. 4A

REMOTE REALTIME INTERACTIVE NETWORK CONFERENCING

CROSS REFERENCE TO RELATED APPLICATION

This application claims the benefit of Indian Provisional Application No. 202241014031, filed on Mar. 15, 2022, which is incorporated hereto for all purposes.

TECHNICAL FIELD

The disclosed embodiments are related to architecture for improving network real-time conferencing and, more particularly, related to using a remote server to operate an application that is streamed to remote client devices.

BACKGROUND

Network conferencing, whether it is a private online meeting between a few individuals or a larger scale meeting such as a webinar or a web townhall meeting, has become increasingly ubiquitous. Network conferencing sessions often involve one or more presenters making a presentation to viewers. However, even the state-of-the-art network conferencing platforms have significant issues in managing video quality, controlling contents and addressing bandwidth issues, particularly when the network of the presenter is unstable. Participants of network conferencing often experience various types of technical challenges that adversely affect their experiences.

For example, bandwidth management is often challenging for conventional network conferencing platforms. Conventional systems often enable presentations by allowing the presenters to share their computer screens. Yet, screen sharing disproportionally imposes a bandwidth burden on the presenter's video because the video content is usually streamed from the presenter's device to other viewers. This could cause connection issues, especially when the presenter's device uses a network that has a low upload bandwidth, which is common for a private Internet network such as a home network. The screen sharing of the presenter also puts a burden on the presenter device's processing power. Any issues on the network or processing bandwidth may result in a low framerate, lag, audio-video out of sync, or even a complete disconnect of the presentation session.

Screening sharing can also be problematic in content control and interactivity. It is rather common to experience a situation where a presenter accidentally shares wrong or confidential content in a screen sharing session. In a screen sharing session, other information and software processes may pop up and reveal private information and disrupt the presentation flow. In an organizational setting, what should be streamed during a presentation can be concerning for a company because valuable confidential contents could easily be leaked accidentally in screen sharing. The challenges can be particularly problematic for regulated industries. For example, in certain settings, a presenter is required to disclose only approved content to viewers and the viewers are often required to receive all relevant information. In a screen sharing option, any accidental pop up or other document or an application window not only may disclose unapproved content, but also potentially obscure critical content (e.g., drug efficacy or side effects) in the presentation slides. Conventionally there is no effective mechanism for an organization to control the content in a presentation.

Conventional network presentation also often lacks interactivity because the presentation content is fixed. For example, a typical presentation slide is often stateful content that progresses screen by screen and slide by slide. The content is static and linear. What can be presented is also limited by the capacity of the presenter's device, especially in a screen sharing session where the viewers are watching the presenter's screen therefore the presentation will be limited by what the presenter's device can offer. Many interactive contents are also difficult to present in a conventional setting. For example, it is often difficult for a presenter to show a video to viewers by streaming the screen of the presenter. Conventionally there is no effective way to also share an audio channel to the viewers that will synchronize with the video. Presenters sometimes opt for playing the video on a loudspeaker and let the viewers listen to the echoic sound.

BRIEF DESCRIPTION OF THE DRAWINGS

FIG. 4A is a conceptual diagram illustrating a first example of a page presentation material that may be loaded in the application operated at a computing server, in accordance with some embodiments.

Figure 1:
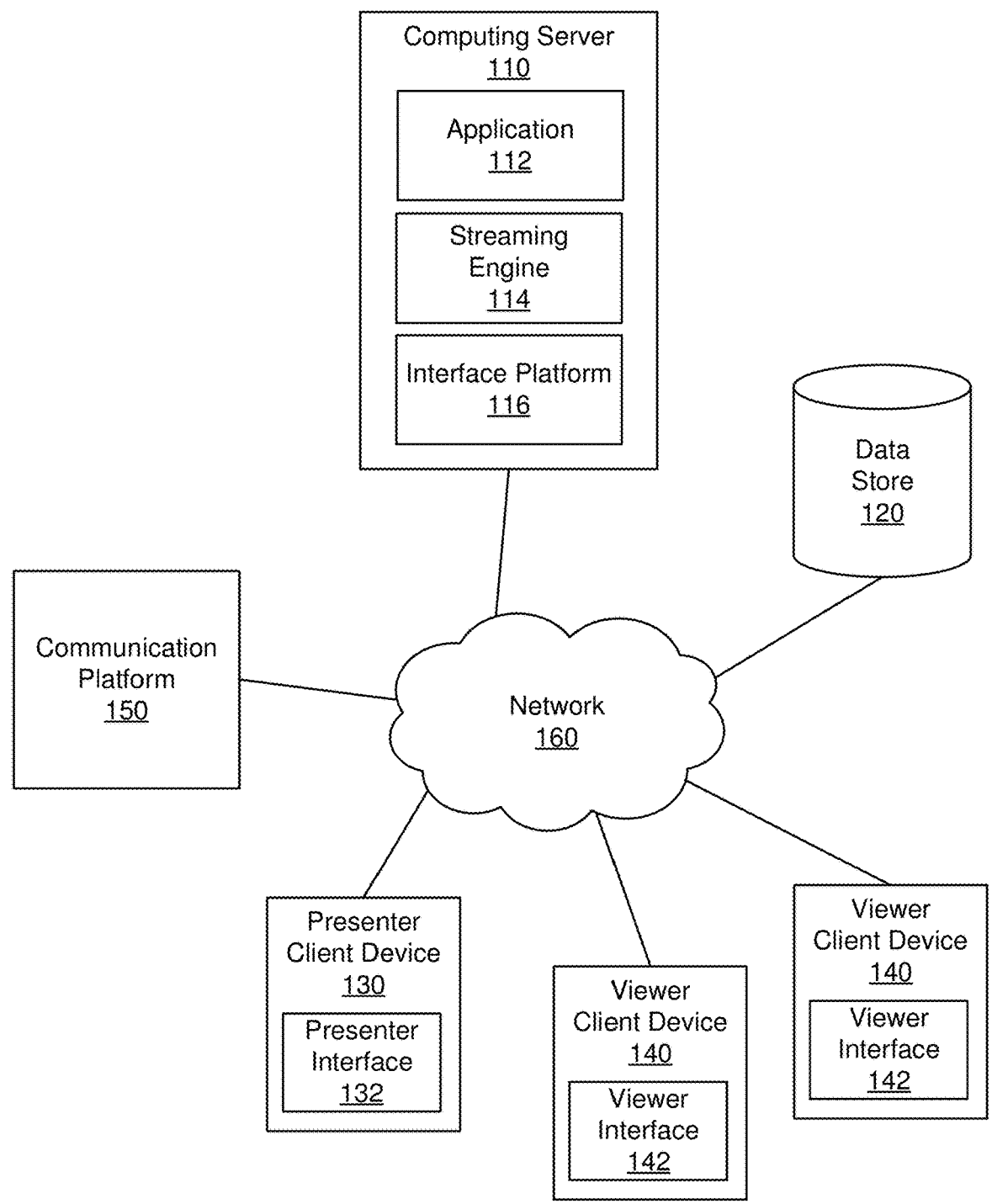
FIG. 1 is a block diagram illustrating an environment of an example network conferencing system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed are example embodiments relating to network conferencing systems that improve upon conventional conferencing platforms. An example system may include a remote computing server that is in communication with client interfaces that display video streams of an application, such as a browser session, operated at the remote computing server. In some embodiments, a server-side browser session may be used to load the presentation material in the remote computing server. The presentation material is live streamed from the server to the client interfaces. The system may also establish a control data channel between the presenter client device and the computing server. The presenter interface may capture interactive events such as mouse events, keyboard events and touch events and transmit the events to the remote server. The remote server in turn may replay the events after optionally transforming the coordinate system from the presenter's viewport to the server-side viewport. As such, the presenter may direct actions at the video of the presentation material that in effect remotely controls the application operated at the computing server to change the presentation material. The actions and the changes of the presentation material are streamed to the presenter and the viewers.

In some embodiments, streaming protocols such as Web Real-Time Communication (WebRTC) may be used to reduce the latency between the server-side session and each connected client, allowing real-time sharing. The presenter may interact with the livestream feed practically like the presenter is running the content locally. Other features of various embodiments described in the present disclosure will be further discussed with reference to various figures below.

Example System Environment

Referring now to FIG. 1, a block diagram that illustrates an environment of an example network conferencing system 100 is shown, in accordance with some embodiments. By way of example, the network conferencing system 100 may include a computing server 110, a data store 120, different client devices such as a presenter client device 130 and several viewer client devices 140, and a communication platform 150. Network conferencing may include any types of web conferencing such as webinars, webcasts, and other types of web meetings. In various embodiments, the system 100 may include fewer and additional components that are not shown in FIG. 1. The components in the system 100 may communicate through the network 160. The components in the system 100 may cooperate to provide various interfaces and system components to conduct a network conferencing, such as having a presenter make a presentation to different viewers through the mechanism and functionality provided by computing server 110 that will be discussed in further detail in this disclosure.

In this disclosure, while a component may at times be described in a singular form or in a plural form, each of the components may include one or more of each of the components. For example, in many situations, the data store 120 is described as a single device. However, in various embodiments, the data store 120 may also be a group of data storage servers that collaborate to store data, such as in the situation of Cloud storage and distributed storage nodes. Likewise, a client device in this disclosure may sometimes be described in a singular form, but in network conferencing there are often multiple participants who use different client devices.

The computing server 110 may include one or more computing devices that provide various functionalities of network conferencing described in this disclosure. In this disclosure, one or more computing devices may collectively and singularly be referred to as a computing server 110, even though the computing server 110 may include more than one computing device. For example, the computing server 110 may be a pool of computing devices that may be located at the same geographical location (e.g., a server room) or distributed geographically (e.g., cloud computing, distributed computing, or in a virtual server network).

The computing server 110 may also be referred to as a remote server, an online server, or a cloud server. The computing server 110 is a remote server from the perspective of a client device such as the presenter client device 130. The computing server 110 provides functionalities that are not locally generated by the presenter client device 130. In various embodiments, the computing server 110 connects with the presenter client device 130 through the Internet. In some embodiments, the computing server 110 may also connect with the presenter client device 130 through a private network. For example, an event organizer may use the network conference technology described in this disclosure to set up a large-scale presentation for live audiences from various geographical locations, some connected through the Internet while others may use the event organizer's network to connect to the conference.

Figure 9:
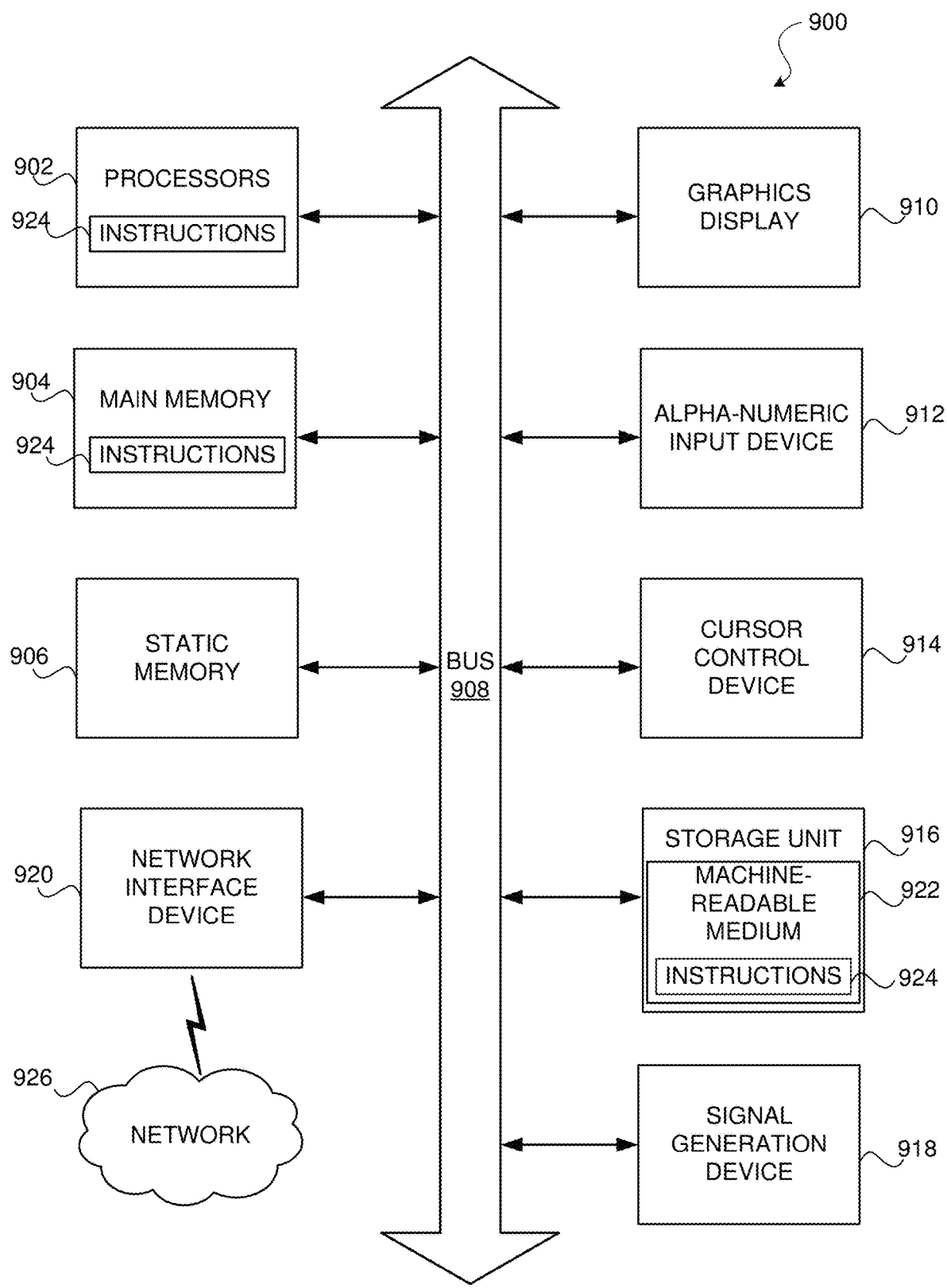
FIG. 9 is a block diagram illustrating components of an example computing machine, in accordance with an embodiment.

A computing device of the computing server 110 may take the form of software, hardware, or a combination thereof (e.g., a computing machine of FIG. 9). For example, parts of the computing server 110 may be a server, a PC, a tablet, a smartphone, or any machine capable of executing instructions that specify actions to be taken by that machine. Parts of the server 120 may include one or more processing units (e.g., a central processing unit (CPU), a graphics processing unit (GPU), a digital signal processor (DSP), a controller, a state machine, one or more ASICs, one or more RFICs, or any combination of these) and a memory.

The computing server 110 may include various components that provide the network functionality described herein. In some embodiments, the computing server 110 includes an application 112, a streaming engine 114, and an interface platform 116. The application 112, the streaming engine 114, and the interface platform 116 may be software engines or may be a combination of software and hardware. For example, the application 112 may be a software application that runs one or more presentation materials for the network conferencing sessions. The streaming engine 114 may be a combination of software and hardware that provide video and other data streams to various client devices.

As it will be discussed in further detail, the computing server 110 may provide a majority of network conferencing functionality and support bandwidth for various client devices. In some embodiments, the computing server 110 may load a presentation material in the application 112, which is operated at the computing server 110. The application 112 may be a web browser or another suitable content renderer. The computing server 110 may transmit video streams of the presentation material displayed in the content renderer to different remote client devices that are in the network conferencing session, such as a video conferencing session. The presentation material may be controlled remotely from the presenter client device 130, which is one of the remote client devices. The presenter client 130 may run a presenter interface 132 that is in communication with the computing server 110 and displays the presentation material based on data of one of the video streams. The computing server 110 may receive actions of a presenter directed at the presenter interface 132 operated in the presenter client device 130. The computing server 110 may control the presentation material in the content renderer according to the actions directed at the presenter interface 132. The computing server 110 may continue to provide video streams to various other client devices such that multiple viewer client devices 140 that are in the network conferencing session will view the presentation as if the presenter is directly presenting the material at the presenter client device 130. Further detail of the operation of a network conferencing session is discussed with reference to FIG. 3.

The application 112 may be any suitable software application that operate at the computing server 110 for rendering content. The application 112 may also be referred as content renderer. The application 112 is used to load the presentation material and allow the presentation material to progress based on the presenter's remote commands. The computing server 110 may load the presentation material from data store 120 or may receive the presentation material that is directly uploaded by the presenter during the conferencing session. The computing server 110 may include more than one application 112 that can be used to operate the presentation material. The type of content renderer that may be used as the application 112 may depend on the presentation material. For example, in some embodiments, the application 112 is a web browser such as a chromium browser and another suitable browser and the presentation material may include a file that is in the HTML format for the file to be loaded into the web browser. In other embodiments, the application 112 may take the form of other types of content renderers, such as MICROSOFT POWERPOINT, APPLE KEYNOTE, ADOBE READER, etc. The presentation material may be in the corresponding file type supported by the application 112.

The streaming engine 114 provides various types of streams to connect the presenter and the viewers in a network conferencing session. The type of streams may include video streams, audio streams, and a control data stream. Video streams provide image data to the presenter and the viewers. For example, the computing server 110 uses the application 112 to display a presentation material and the frames of the presentation material are streamed to both the presenter and the viewers. The audio streams provide audio signals to and from the presenter and the viewers. For example, the presenter and the viewers may be in a conversation and the streaming engine 114 may forward audio among the presenter client device 130 and the viewer client devices 140. The audio signals may also be initiated from the computing server 110. For example, the presentation material may include multimedia content such as a video clip and the streaming engine 114 may stream both the video and audio to both the presenter and the viewers. Conventional video conferencing software often lacks the capability that allows the presenter and the viewers to watch a video clip synchronically. A control signal stream captures remote commands issued by the presenter who controls the presentation material loaded in the application 112 residing in the remote computing server 110. The streaming engine 114 receives control signals from the presenter client device 130 and determines the remote commands of the presenter based on the captured actions and the coordinates of the actions. An example of the operation in determining the remote commands will be discussed in further detail with reference to FIG. 6.

The streaming engine 114 may use any suitable network protocol and application layer protocol to achieve the streaming. For example, the streaming engine 114 may be developed using User Datagram Protocol (UDP), Transmission Control Protocol (TCP), Real-time Transport Protocol (RTP), Hypertext Transfer Protocol (HTTP) and application programming interfaces (APIs) that connect the streaming engine 114 to the presenter and viewer interfaces. Designers of the streaming engine 114 may also use application-level streaming protocol packages to build the streaming engine 114. Examples of these protocol packages may include Web Real-Time Communication (WebRTC), HTML Live Streaming (HLS), Real Time Messaging Protocol (RTMP), Moving Picture Experts Group-Dynamic Adaptive Streaming (MPEG-DASH) and other peer to peer connection and/or streaming packages that exist. In some embodiments, the application 112 is a web browser and the streaming engine 114 may be a software that is developed from WebRTC that provides web browsers and mobile applications with real-time communication.

The streams to various client devices may be of different natures and support different bandwidths, depending on the network capacity of a particular client device. For example, the streaming engine 114 supports different bandwidths for the video streams to various client devices. The bandwidth of a particular video stream may depend on the network bandwidth between the streaming engine 114 and a particular client device, the resolution selection (which may be automatically selected or manually selected by a user), the screen resolution of the client device, and the CPU bandwidth of the client device. The streaming engine 114 may provide different video streams so that a network connection or a bandwidth issue with a particular client device does not affect the streaming with other client devices. In some cases, the streaming engine 114 may also activate or deactivate a stream. For example, the streaming engine 114 may switch the control data stream to change the presenter in a conferencing session. Details of the switching of the presenter are discussed with reference to FIG. 2A and FIG. 2B.

The interface platform 116 of computing server 110 may be the front-end interface of the computing server 110 that allows customers of the computing server 110 to use the services offered by computing server 110. The interface platform 116 may allow users to upload presentation materials to the computing server 110. The interface platform 116 may also allow users to schedule conference sessions, manage those sessions, and perform various actions associated with network conferencing. In some embodiments, the interface platform 116 may also provide tools for users to design and build presentation materials. For example, in some cases, the interface platform 116 may allow users to build the presentation material in HTML format and store the presentation material in a storage associated with the computing server 110.

In various embodiments, the interface platform 116 may take different forms. For example, the interface platform 116 may be part of a software as a service (SaaS) platform of the computing server 110 that allows a user to perform tasks related to creating a network conferencing. In one embodiment, an interface platform 116 is a web application that runs on JavaScript and other backend algorithms. In the case of a web application, the interface platform 116 cooperates with a web browser to render a graphical user interface. In another embodiment, an interface platform 116 is a mobile application. For example, the mobile application may run on Swift for iOS and other APPLE operating systems or on Java or another suitable language for ANDROID systems. In yet another embodiment, an interface platform 116 may be a software program that operates on a desktop computer that runs on an operating system such as LINUX, MICROSOFT WINDOWS, MAC OS, or CHROME OS.

The data store 120 is a repository for storing data related to network conferencing sessions hosted by computing server 110. The data stored in data store 120 may include presentation materials, audio and video recordings of conferencing sessions, and other related data. The data store 120 may include one or more computing devices with memories for storing various files and data. In various embodiments, the data store 120 may take different forms. In one embodiment, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, object storage, a resource description framework (RDF), etc. In one embodiment, the data store 120 uses various data structures mentioned above.

The data store 120 may be operated by computing server 110 or a third-party storage system such as cloud storage that stores data related to the presenter and/or the viewers. In some embodiments, the data store 120 may be part of a SaaS platform operated by computing server 110. A presenter or her associated organization may upload the presentation material to the data store 120. At the time of the conferencing session, the computing server 110 may retrieve the presentation material and load the material to the application 112. In some embodiments, the data store 120 may be a third-party storage such as a common cloud storage system where the presenter may have an account. A presenter or her associated organization may upload the presentation material to the cloud storage. A pointer such as a unique address may be generated by the data store 120 to identify the presentation material. The presenter may authorize the computing server 110 to retrieve the presentation material based on the pointer.

The presentation material used in a network conferencing session may be preapproved content that is created and approved by an organization. In a conventional video conferencing session, a presenter often relies on screen sharing to share materials with viewers. However, screen sharing is associated with many disadvantages. For example, the presenter may accidentally share undesirable materials with the viewers. Some contents such as a video or an audio clip are also not presentable via screen sharing. Screen sharing also imposes a burden on the presenter device's computation and network bandwidth and often results in lag and a drop in frame rate. The data store 120 allows an organization client of the computing server 110 to create and examine a presentation material in advance of a meeting to ensure the content in the material is approved to be shown to the viewers.

The presenter (or someone else in the organization) may create the presentation material in the format that is supported by the application 112. The application 112 may be referred to as a content renderer. For example, the content renderer may be a web browser and the presenter may design the presentation material in a way similar to designing a webpage. While in some embodiments the presentation material can be similar to a conventional slide presentation that is linear, in other embodiments the presentation material can be designed with webpage tools to allow the presentation to have various branches and interactive elements. The use of HTML to create the presentation material allows the presentation material to include various features, whether the presentation material is linear or branched, fixed or interactive. For example, the presentation material can be interactive and include functionalities and styles that are supported by typical HTML files, such as JAVASCRIPT, Cascading Style Sheets (CSS), embedded interactive objects such as videos and other multimedia contents, other interactive elements, and webpage backend technologies. The interactive possibilities of the presentation material may also continue to expand as tools related to webpages continue to develop. In some embodiments, the presentation material is primarily operated at the computing server 110. This alleviates the bandwidth requirement for a presenter client device 130 to make a presentation in a conferencing session compared to conventional screen sharing.

A client device, whether it is presenter client device 130 or a viewer client device 140, is a computing device used by a participant of a network conferencing. The precise type of client device used by each participant may vary. Examples of client devices include personal computers (PC), desktop computers, laptop computers, tablets (e.g., iPADS), smartphones, wearable electronic devices such as smartwatches, or any other suitable electronic devices. The bandwidth, capability, and screen resolutions of the client devices may vary. In a network conferencing session, the client devices receive video streams of the presentation material and display the presentation material based on data from the video streams. Each client device 130 may include an interface for the participant to join a network conferencing session.

The presenter client device 130 is a client device that makes the presentation. The presenter client device 130 may be assigned with a control data stream that sends interactive events performed at the presenter interface 132 to the computing server 110. In some embodiment, to avoid conflicts in remote commands, only one control data stream is presented in a network conferencing session so that only one client device is assigned with the control data stream. In some embodiments, the client device that is assigned with the control data stream is considered to be the presenter client device 130 and the rest of client devices are viewer client devices 140. The control data stream may be reassigned to another client device to switch presenter. The presenter client device 130 includes a presenter interface 132 that allows the presenter to participate in the network conferencing session and performs interactive events to remotely control the presentation material that resides in the computing device 110.

Alternatively or additionally, in some embodiments, multiple control data streams are established with different client devices so there are multiple presenter client devices 130 that are capable of remotely controlling the presentation material.

The presenter interface 132 may be a software platform that allows the presenter to participate in the network conferencing. The presenter interface 132 may provide a graphical user interface (GUI) for the presenter to participate in a network conferencing session, receive images and audio of other participants, manage the setting of the conferencing session, and perform interactive events directed at the presenter interface 132. The interactive events directed at the presenter interface 132 may be transmitted as remote command signals to the remote computing server 110 for remotely controlling the application 112 operated at the computing server using the interactive events. In some embodiments, the presenter interface 132 may be software that is developed by the operating company of the computing server 110. For example, the operating company may develop a new conferencing software platform. In some embodiments, the presenter interface 132 may be part of a third-party messaging or conferencing platform that is widely used and the operating company provides in-app customization or features in the third-party platform.

In various embodiments, the presenter interface 132 may take different forms. For example, a presenter interface 132 may be part of a SaaS platform operated by the computing server 110. In some embodiments, a presenter interface 132 is a web application that runs on JavaScript and other backend algorithms. In the case of a web application, the presenter interface 132 cooperates with a web browser to render a front-end interface. In some embodiments, a presenter interface 132 is a mobile application. For example, the mobile application may run on Swift for iOS and other APPLE operating systems or on Java or another suitable language for ANDROID systems. In some embodiments, a presenter interface 132 may be a software program that operates on a desktop computer that runs on an operating system such as LINUX, MICROSOFT WINDOWS, MAC OS, or CHROME OS. In some embodiments, a presenter interface 132 is an embedded application inside a third-party communication platform 150.

The viewer client devices 140 and viewer interfaces 142 are similar to presenter client devices 130 and presenter interface 132 except they are devices and interfaces for the viewers. In some embodiments, a viewer client device 140 does not establish a control data stream with the computing server 110 so that the viewer client device 140 does not have control over the application 112 remoted operated at the computing server 110. A viewer client device 140 receives a video stream of the presentation material. The viewer interface 142 displays the presentation material for a viewer based on the data of the video stream. In various embodiments, a client device may also receive an audio stream. The transmission of audio stream is similar to the video stream and may not be additionally discussed in this disclosure. Those with ordinary skills in the art would understand that various features described herein may involve only video stream, only audio stream, or both video and audio streams.

A communication platform 150 is a server that provides communication services to any users, such as messaging services and conferencing services. A communication platform 150 allows one or more users to participate in any number of conversations with others, such as in the form of private chats, group chats, chatrooms, forums, conferencing, etc. The conversations between users may take the form of text messages, image messages, voice messages, video conferences, etc. Text messages may include text strings using alphabetical letters, numbers, foreign letters and characters, and other suitable text. Text messages may also include other symbols, graphics, ideograms such as EMOJI, customized image messages, etc. Conferencing may include any types of web conferencing such as webinars, webcasts, and other types of web meetings.

The communication platform 150 may take different forms. In some embodiments, a communication platform 150 is an independent software application developed by the company that operates the computing server 110. For example, the communication platform 150 is part of the interface platform 116 of the computing server 110. In other embodiments, a communication platform 150 is part of a third-party platform that is widely used. For example, a communication platform 150 may take the form of a network conferencing platform such as ZOOM, MICROSOFT TEAMS, SLACK, WEBEX, SKYPE, etc. In some embodiments, a communication platform 150 may take the form of an instant messaging platform such as WHATSAPP, TELEGRAM, WECHAT, LINE, FACEBOOK MESSENGER, GOOGLE HANGOUTS, etc. In some embodiments, presenter interface 132 and viewer interface 142 may be customized embedded applications developed by the operating company of the computing server 110 that run in a third-party communication platform.

The communications between the client devices and the computing server 110 may be transmitted via a network 160, for example, via the Internet. The network 160 provides connections to the components of the system 100 through one or more sub-networks, which may include any combination of the local area and/or wide area networks, using both wired and/or wireless communication systems. In one embodiment, a network 160 uses standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), User Datagram Protocol (UDP), Real-time Transport Protocol (RTP), hypertext transport protocol (HTTP), simple mail transfer protocol (SMTP), and file transfer protocol (FTP). In some embodiments, all or some of the communication links of a network 160 may be encrypted using any suitable technique or techniques such as secure sockets layer (SSL), transport layer security (TLS), virtual private networks (VPNs), Internet Protocol security (IPsec), etc. The network 160 also includes links and packet switching networks such as the Internet.

Example Data Stream Connections

Figure 2A:
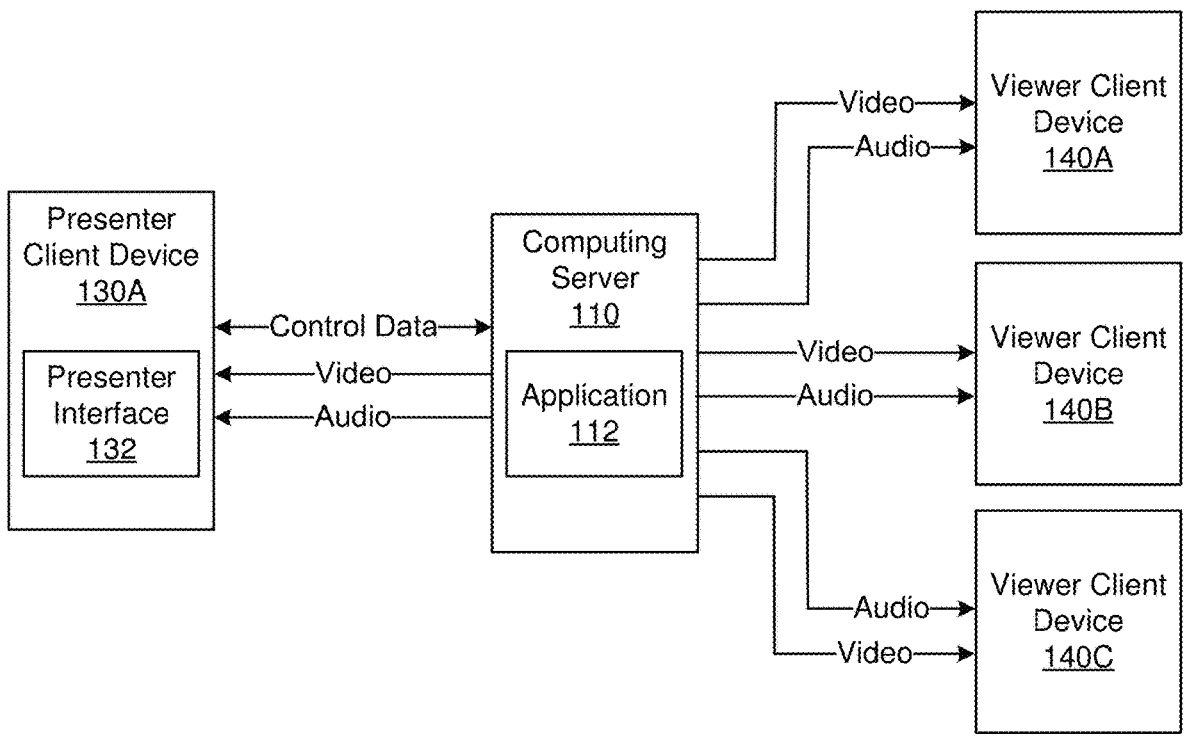
FIGS. 2A and 2B are block diagrams illustrating the connections among client devices and the computing server, in accordance with some embodiments.
Figure 2B:
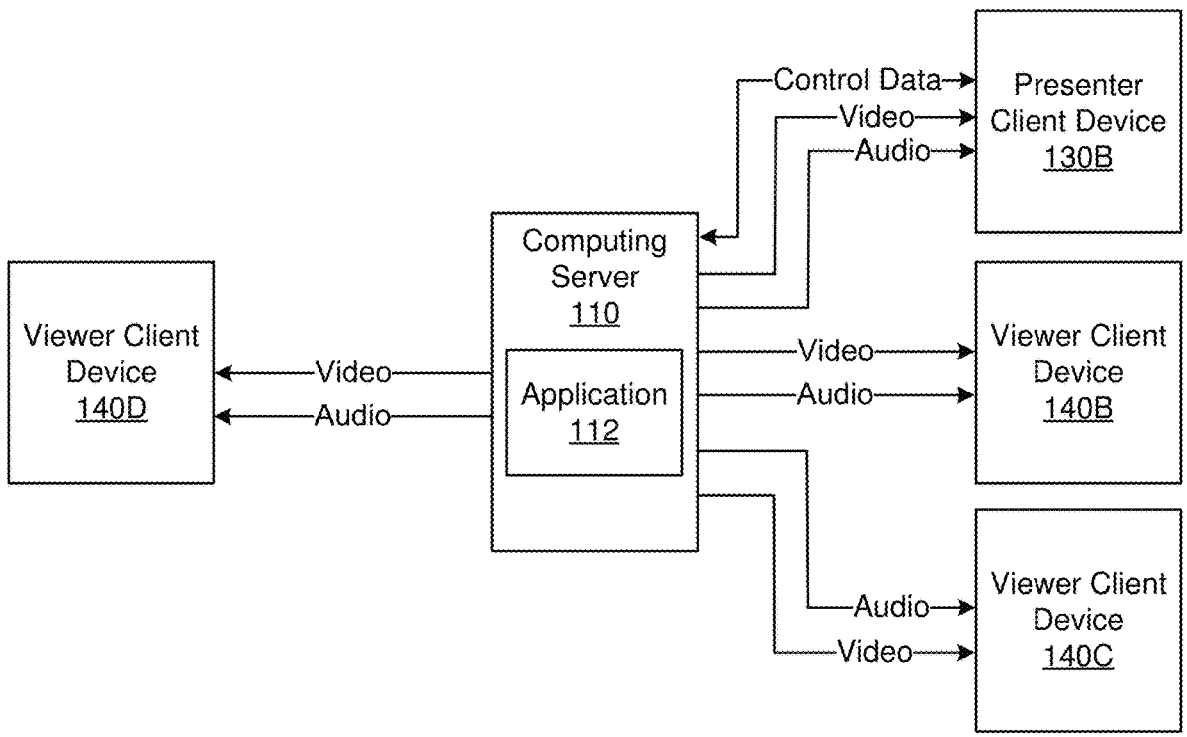

FIGS. 2A and 2B are block diagrams illustrating the connections among client devices and the computing server 110, in accordance with some embodiments. The computing server 110 establishes different data streams with various client devices. The data streams may include video streams, audio streams, and control data streams. Among a type of stream, the data streams may provide different data to client devices, depending on the bandwidth and specification of the client devices. For example, the video stream with the viewer client device 140A may be different from the video stream with the viewer client device 140B as the two viewer client devices 140A and 140B may have different bandwidths and image resolutions. Each data stream may be unidirectional or bidirectional. For example, on one hand, the computing server 110 may transmit audio to all client devices when the conferencing session is playing multimedia content, such as an online video, from the computing server 110. On the other hand, the computing server 110 may receive audio from any client device as a participant speaks in the conferencing session. In some embodiments, the computing server 110 may also rely on the video and audio streams of the communication platform 150 for some of the communication between the presenter and viewers. For example, in some embodiments, the images of the participants are streamed using the channels provided by the communication platform 150. The audio that carries the discussion among the presenter and the viewers may also be streamed using the communication platform 150. However, the video of the presentation material is streamed from the computing server 110 and the control of the presentation material is communicated between the presenter client device 130 and the computing server 110. For an embedded video, video and audio may be streamed from the computing server 110. Additionally, another audio stream such as the conversation between the participants can also be established. As such, an embedded video can be played and the participants can comment on the video as the video is being played.

In a network conferencing session, the video of a presentation material is streamed from the computing server 110 to client devices 130 and 140. For example, the computing server 110 loads a presentation material to the application 112. The computing server 110 streams the video of the presentation material to both the presenter client device 130A and the viewer client devices 140A, 140B, and 140C. The client devices 130A, 140A, 140B, and 140C download the video of the presentation material from the video streams transmitted from the computing server 110. Unlike a conventional system where a presentation is often performed by a presenter client device's screen sharing, the streaming of the video of the presentation material from the computing server 110 reduces the burden on the network and CPU bandwidth of the presenter client device 130A. In a conventional system, the video is often streamed from the presenter client device, which may be associated with an individual who uses regular household broadband that is often equipped with insufficient upload speed to support a screen sharing with a large number of viewers.

A presenter client device 130A, which has the control data stream established, issues remote commands to control the application 112 that resides at the computing server 110. The presenter interface 132 displays the presentation material based on data from a video stream. From the angle of the presenter, the video of the presentation material may be perceived as a local application running in the presenter client device 130A. However, the presenter interface 132 is merely displaying a video of the presentation material. The presenter may direct interactive events at the presenter interface 132 to control the presentation material. The presenter interface captures the interactive events of the presenter directed at the presenter interface 132. Possible interactive events may include mouse actions (e.g., clicks, drags, scrolls, movement of the cursor, coordinates of the actions, etc.), keyboard actions (e.g., typing of a particular key), touch actions in the case of a tablet (e.g., finger touch, drags, multiple finger actions, etc.), and any suitable capturable actions associated with the use of presenter client device 130A. The presenter interface 132 transmits the interactive events of the presenter to the computing server 110 for remotely controlling the application 112 operated at the computing server 110.

In some embodiments, only one control data stream among the client devices is in communication with the computing server 110 during a network conferencing session. The control data stream is established with a presenter client device 130 so that the presenter client device 130 can send remote commands to the application 112 operated at the computing server 110. The control data streams between the computing server 110 and viewer client devices 140 are disconnected to avoid conflicts in remote commands if more than one control data stream is established. A presenter performs an interactive event with the video of a presentation material, the interactive event is captured by presenter interface 132 and is sent to remotely control the application 112. The client device that is in possession of the control data stream is considered to be presenter client device 132.

In some embodiments, the control data stream is switchable to turn a viewer client device 140 into a presenter client device 130. FIG. 2B illustrates the switching of presenter client devices, in accordance with some embodiments. A control data stream of the viewer interface is activatable to switch the viewer interface to a new presenter interface. For example, the control data stream of the original viewer client device 140A is established in FIG. 2B. The old control data stream with the original presenter client device 130A is terminated. As such, the original viewer client device 140A has become the new presenter client device 130B. The original presenter client device 130A, with the control data stream disconnected, has become a viewer client device 140D. The control data stream may further be switched to other client devices.

Example Network Conferencing Session

Figure 3:
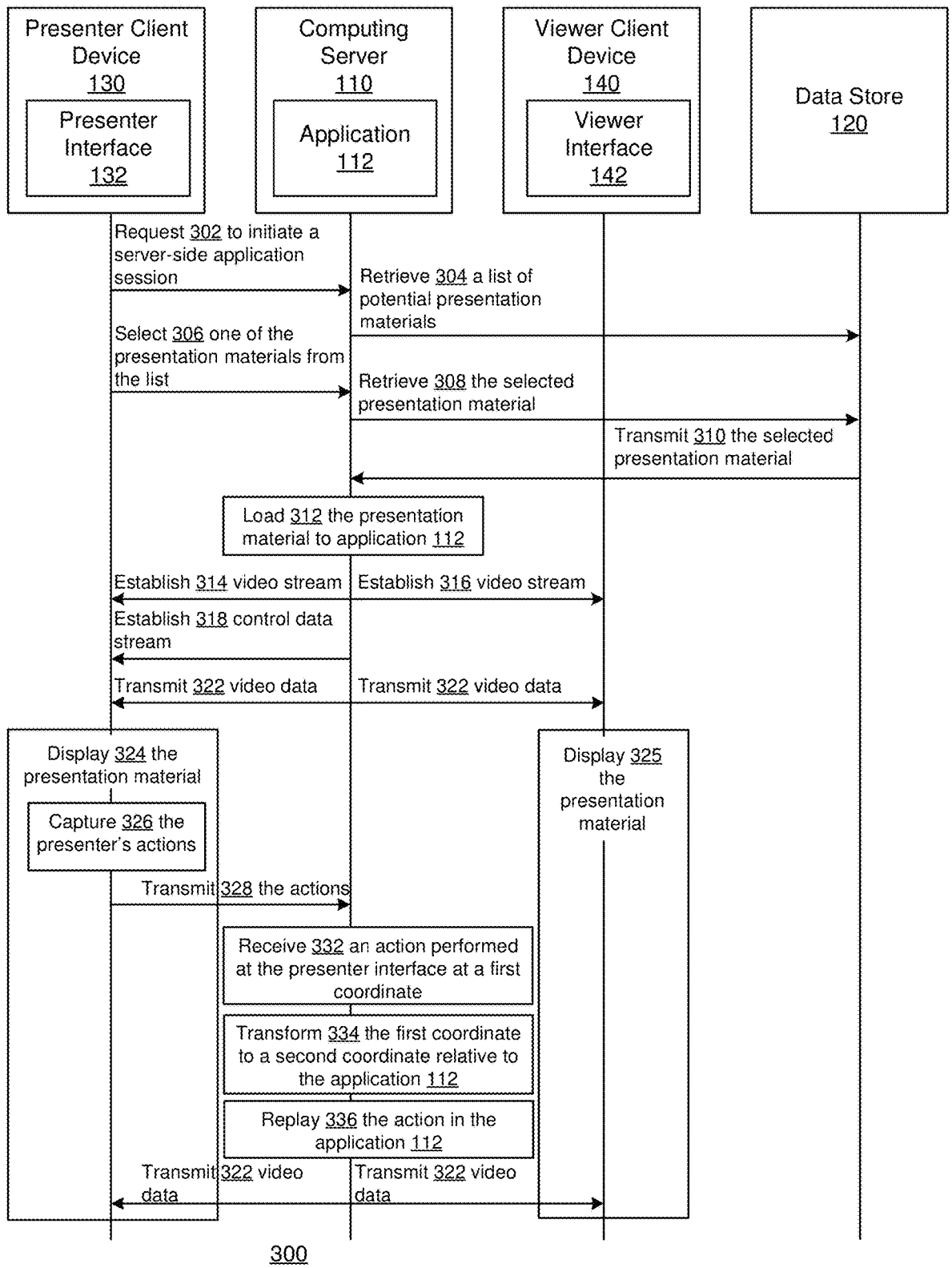
FIG. 3 is a flowchart depicting an example process for operating a network conferencing session, in accordance with some embodiments.

FIG. 3 is a flowchart depicting an example process 300 for operating a network conferencing session, in accordance with some embodiments. The network conferencing session includes a presenter discussing a presentation material to one or more viewers through a server-side application session. The application session may be operated by a browser and another appropriate application 112. The presentation material is hosted at computing server 110 and is streamed to both the presenter client device 130 and the viewer client device 140. The presenter client device 130 remotely controls the presentation material.

In some embodiments, the presenter client device 130 may request 302 the computing server 110 to initiate a server-side application session. For example, the presenter client device 130 may include a presenter interface that is in communication with the computing server 110. The presenter may be in preparation for a network conferencing session or may have already been in the session. The presenter interface may include a button that allows the presenter to select to start a presentation mode. Upon the presenter's selection, the request 302 is sent to computing server 110.

In some embodiment, the computing server 110 may retrieve 304 a list of potential presentation materials from the data store 120 in response to the request 302. The computing server 110 may retrieve the list of potential presentation materials based on the user identifier of the presenter. For example, the presenter's identifier may be associated with an organization. The computing server 110 may retrieve the list of potential presentation materials from an authorized list approved by the organization. The authorized list may be a list of pre-approved presentation materials that are reviewed and uploaded by the presenter or the presenter's organization. The presenter client device 130 may select 306 one of the presentation materials from the list. The computing server 110 may retrieve 308 the selected presentation material from a repository such as the data store 102. In response, the data store 120 transmits 310 the presentation material to the computing server 110. Alternatively or additionally, the presentation material may be uploaded directly from the presenter client device 130 at the start of the presentation mode instead of being retrieved from the data store 120. For example, the presenter interface may provide a feature for the presenter to upload the presentation material directly to the computing server 110.

The computing server 110 may load 312 the presentation material to an application 112 such as a server-side content renderer that is operated at the computing server 110. For example, as discussed above, the presentation material may include an HTML document and the application 112 may load the presentation material similar to opening a webpage. The application 112 displays and controls the presentation material at the server-side since the application 112 resides at the computing server 110. The computing server 110 may establish 314 a video stream with the presenter client device 130 and establish 316 a video stream with the viewer client device 140. The computing server 110 may further establish 318 a control data stream with the presenter client device 130.

The computing server 110 may transmit 322, via video streams, data of the video images of the application 112 that displays the presentation material to the presenter client device 130 and the viewer client device 140. Each client device may support different screen resolutions so that the video streams may be different for each client device. The computing server 110 may continue to provide streams of the application 112 to various client devices until the video streaming session is over. The computing server 110, the presenter client device 130, and the viewer client device 140 also continue to exchange audio data throughout the network conferencing session. The exchange of audio data is not further discussed.

Upon receiving the video stream, the presenter client device 130 may display 324, via the presenter interface 132, the presentation material based on data from one of the video streams. From the perspective of the presenter, it might seem that the presenter interface 132 is running an application that loads the presentation material. However, the presenter interface 132 displays the stream of the application 112 that is remotely operated at the computing server 110. The viewer interface 142 also displays 325 the presentation material. In some embodiments, the presenter interface 132 and the viewer interface 142 are synchronized and are displaying the same presentation materials despite the resolutions of the videos may be different.

The presenter client device 130 may remotely control the presentation material. For example, the presenter may issue interactive events directed at the presenter interface 132 that is displaying a video of the presentation material. The interactive events may include mouse actions (e.g., moving, left clicking, right clicking, scrolling, dragging), keyboard actions (e.g., typing of a key), touch actions in the case of using a tablet (e.g., clicking, dragging, tapping, finger gesture), etc. The presenter interface 132 may capture 326 the interactive events of the presenter directed at the presenter interface. The presenter interface 132 may capture the type of interactive event (e.g., whether it is a left click, a right click, or a keyboard event) and the coordinates of the event where it happened. In some embodiments, the resolution of the video of the presentation material displayed at the presenter interface 132 is different from the resolution used in the application 112. The presenter interface 132 captures the coordinates of the event so that the computing server 110 may determine the corresponding coordinates of the application 112 based on the resolution scale between the presenter interface 132 and the application 112. In some embodiments, instead of the computing server 110, the presenter interface 132 may calculate the corresponding coordinates of the application 112. An example of how a remote command may be determined is further discussed in FIG. 6. The presenter interface 132 may transmit 328 the interactive events of the presenter to the computing server 110 for remotely controlling the application 112 operated at the computing server 110.

The computing server 110 may rely on the interactive events directed at the presenter interface 132 to control the presentation material. For example, the computing server 110 may receive 332 a particular interactive event performed at the presenter interface 132 at a first coordinate relative to the first display resolution operated at the presenter interface 132. The computing server 110 may transform 334 the first coordinate to a second coordinate relative to the second display resolution operated at the application 112. The computing server 110 may replay 336 the particular interactive event in the application 112 using the second coordinate. Put differently, the interactive event directed at the presenter interface 132 may be recreated at the application 112 on the server-side.

Throughout the conferencing session, the video of the presentation material is continuously streamed to the presenter client device 130 and the viewer client device 140 as indicated in the transmission 322 of the video data in the process 300. As such, both the presenter and the viewer will see the actions and the change that occurred in the presentation material.

In some embodiments, since the content session is managed on the server side, in case of any network issues or disconnection happening on either the presenter client device 130 or viewer client device 140, the computing server 110 allows both presenter and viewers to reconnect to a running session without losing session context or content. Managing the content session on the computing server 110 also allows more fine-grained control over scaling and network bandwidth and reduces dependency on the network connectivity of any one participant in the call.

The control data stream established with the presenter client device 130 may be switched to another device to change the presenter. For example, the control data stream of the viewer interface 142 is activatable to switch the viewer interface to become a new presenter interface. Once a new control data stream is established, the new presenter can remotely control the presentation material.

Example Presentation Materials

Figure 4A:
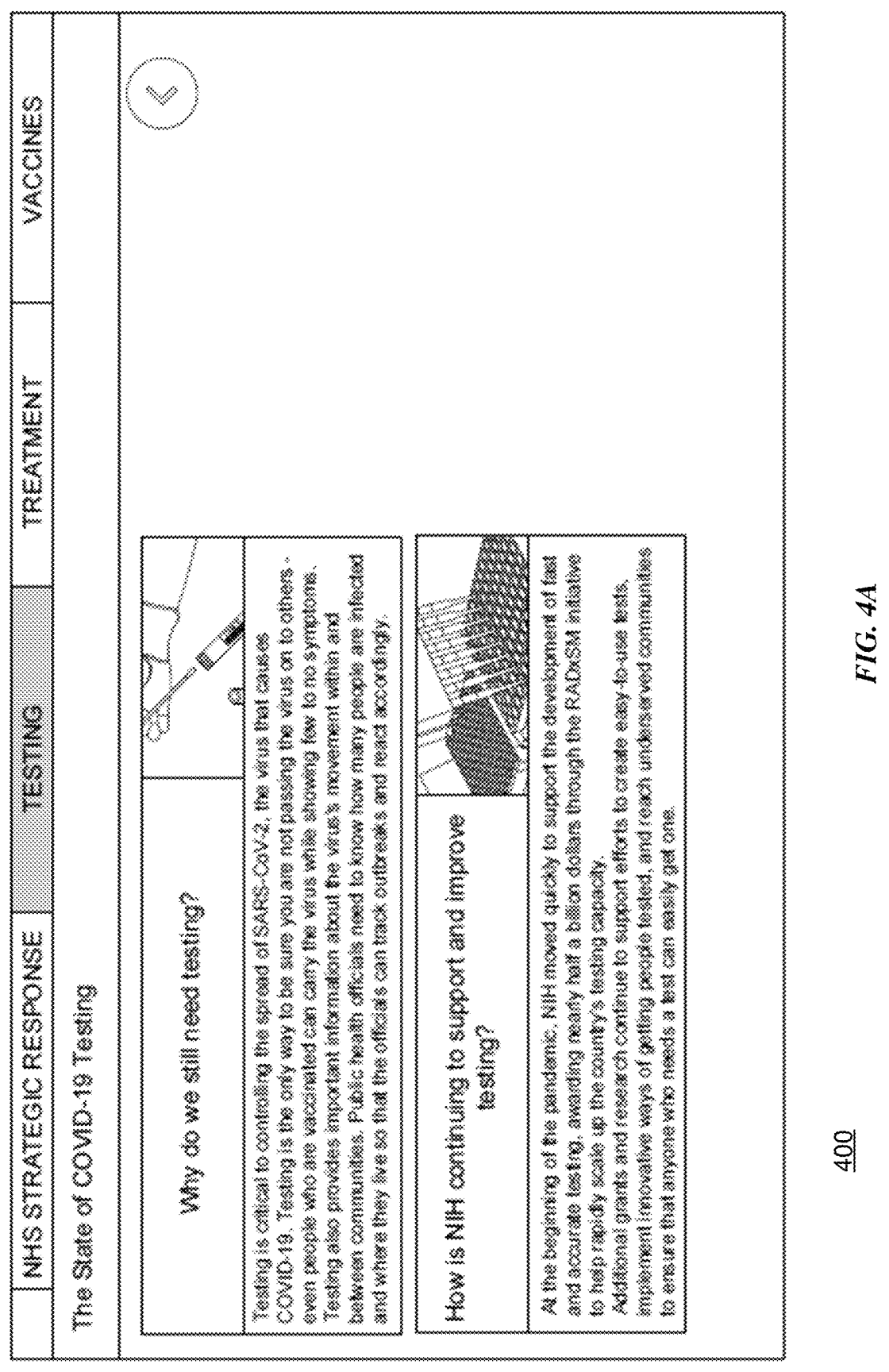
Figure 4B:
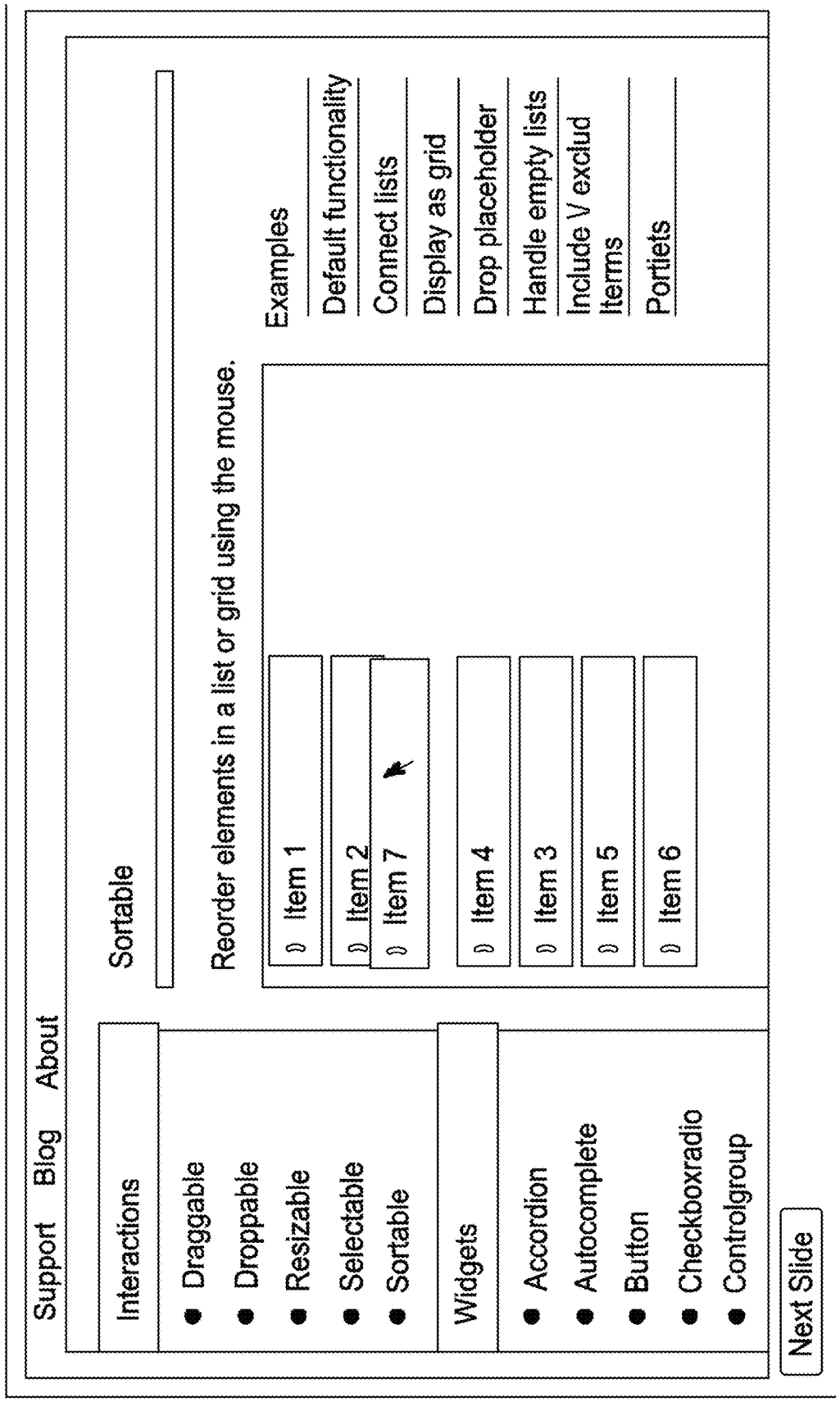
FIG. 4B is a conceptual diagram illustrating a second example of a page presentation material that may be loaded in the application operated at a computing server, in accordance with some embodiments.
Figure 5:
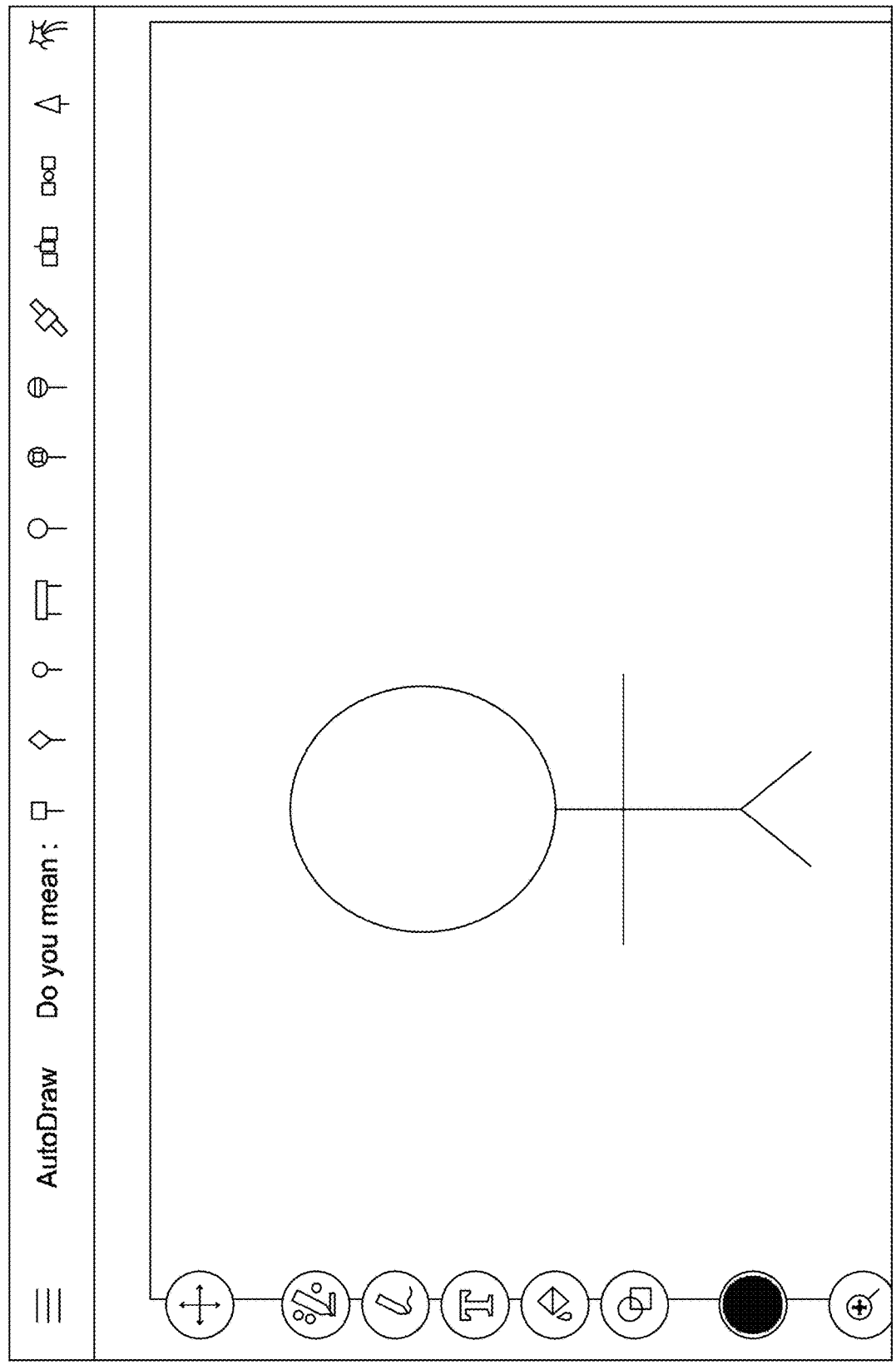
FIG. 5 is a conceptual diagram illustrating a third example of a page presentation material that may be loaded in the application operated at a computing server, in accordance with some embodiments.

FIG. 4A, FIG. 4B, and FIG. 5 are conceptual diagrams illustrating different examples of pages of presentation materials that may be loaded in the application 112 and displayed at a presenter interface 132 or a viewer interface 142, in accordance with some embodiments. The first page 400 and the second page 450 illustrate examples of the slides of a presentation material. The third page 500 illustrates an interactive page of a presentation material that allows the presenter to make drawings in real-time using web-based drawing tools. Those pages may be created using HTML and related web development tools. This allows the presentation material to be interactive. The creator of the presentation material may also have a highly expanded selection of tools to develop the presentation material as new webpage development tools continue to develop. Alternatively or additionally, the presentation material may also be developed using other applications such as POWERPOINT, KEYNOTE, etc.

Page 450 illustrated in FIG. 4B is a webpage-like slide of a presentation material that may be created and preapproved by an organization. The page 450 can be in a layout that is similar to a presentation slide, but it includes various webpage-like features that allowable a presenter to interact with the presentation material. In some embodiments, the presentation material may include interactive elements (e.g., CSS interactive elements) such as navigation bars, dropdown menus, image galleries, forms, counters, hover tooltips, buttons, paginations, pop-ups, tables, etc. For example, in the page 450, the items in a menu list can be reordered using a mouse, as item 7 is being illustrated in FIG. 4B as being dragged up and down for reordering. The interactive items may be draggable, droppable, resizable, selectable, sortable. Unlike conventional presentation slides, the webpage-like slide 450 may also be part of a non-linear or branched presentation material. For example, the presenter may not need to go through the presentation material slide by slide. Instead, the page 450 may include one or more HTML links that allow the presenter to select and jump back and forth to different slides.

Page 500 illustrated in FIG. 5 is an interactive page that may be created in a presentation material, in accordance with some embodiments. The example interactive page illustrated is a drawing tool that allows the presenter to make drawings in real time. In various embodiments, other interactive items are also possible. For example, a page of a presentation material may include a software program that is operated by JAVASCRIPT in the backend. A presentation material may also include an embedded video that can be watched and listened to synchronically for the participants of the network conferencing session. The embedded video and/or audio can be played seamlessly alongside the conversation between the participants. In various embodiments, the possible interactive items that may be included in a presentation material is virtually unlimited because any suitable web development tools may be used in creating the presentation material.

Example Remote Commands

Figure 6:
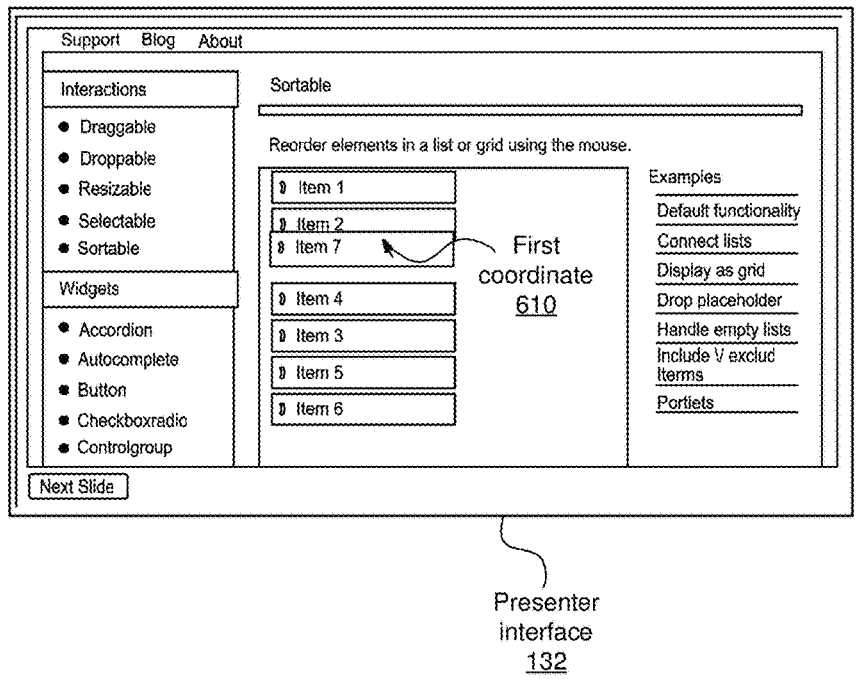
FIG. 6 is a conceptual diagram illustrating a process for a presenter to remotely control a presentation material using interactive events directed at a video of the presentation material displayed at the presenter interface, in accordance with some embodiments.
Figure 6:
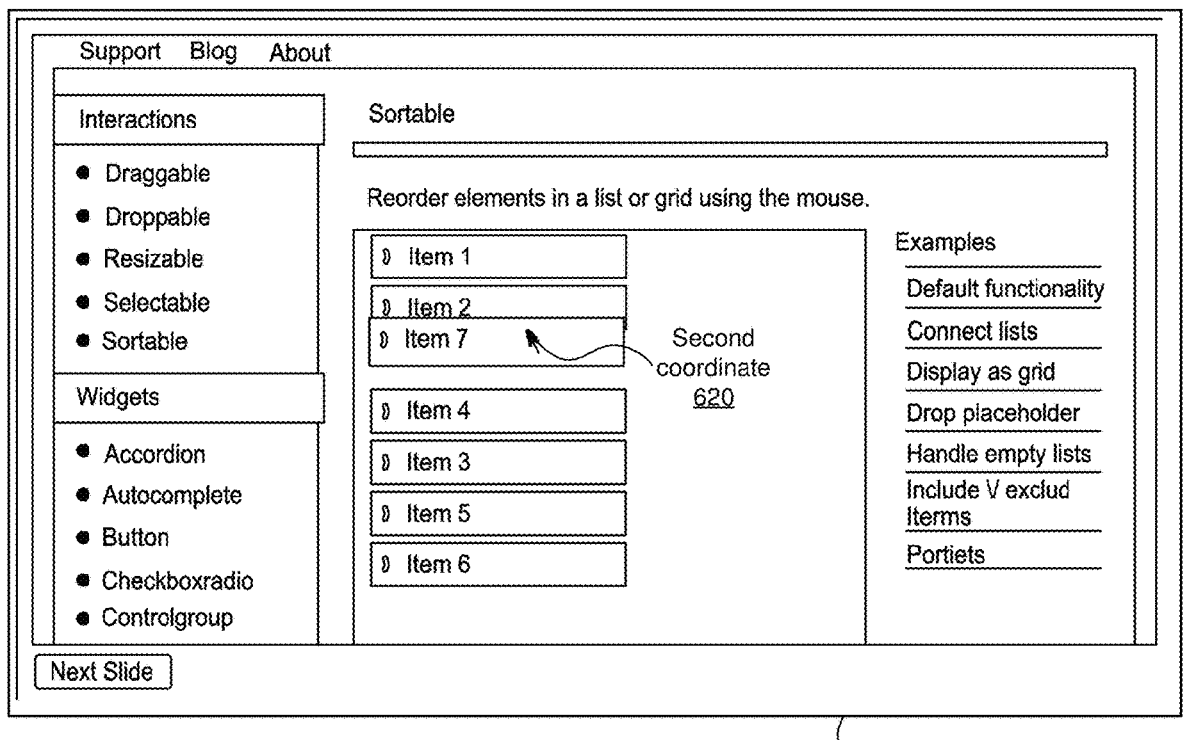

FIG. 6 is a conceptual diagram illustrating a process for a presenter to remotely control a presentation material using interactive events directed at a video of the presentation material displayed at the presenter interface 132, in accordance with some embodiments. The presenter interface 132 is displaying a video of the presentation material. The presentation material displayed at the presenter interface 132 is in a first display resolution. The application 112 is running the presentation material remotely at the computing server 110. The application 112 is in a second display resolution different from the first display resolution. In some embodiments, the selection of resolution by the application 112 may be based on the contents dimension for best fit of the content. For example, in the particular example shown in FIG. 6, the first resolution at the presenter interface 132 is lower than the second resolution at the application 112. In some embodiments, the display resolution of the presenter interface 132 (and viewer interface 142) is customizable. Hence, the first resolution may be lower, the same, or higher than the application 112. The client device may use display resolution of the server side for rendering and scaling. The resolution values of the client device may be picked off from the system environment. The computing server 110 can determine the resolution ratio.

The computing server 110 may receive interactive events directed at presenter interface 132 to control the application 112 operated at the computing server 110. The presenter interface 132 and the application 112 may be different software applications. For example, in one embodiment, the presenter interface 132 is a network conferencing software application such as a custom-made application provided by computing server 110, ZOOM, TEAMS, SLACK, GOOGLE or WEBEX. The application 112 is a web browser such as a chromium browser. In another example, the presenter interface 132 is a web-based application that is run at a client-side web browser and the application 112 is a server-side web browser. The computing server 110 uses the interactive events directed at one software application operated at the presenter client device 130 to control another software application.

By way of example, the computing server 110 may receive an interactive event performed at the presenter interface 132 at a first coordinate 610 relative to the first display resolution operated at the presenter interface 132. In FIG. 6, the example interactive event is a dragging of item 7 in a sortable menu. The computing server 110 may receive the action type, the first coordinate 610 and the value of the first display resolution. The computing server 110 may transform the first coordinate 610 to a second coordinate 620 relative to the second display resolution operated at the application 112. The transformation may be determined based on the ratio of the first display resolution and the second display resolution. The computing server 110 may replay the interactive event in the application 112 using the second coordinate 620. In this case, the item 7 is dragged by a mouse associated with the application 112. The interactive event is streamed to presenter interface 132 so that it appears to the presenter that presentation material is operated at the presenter interface 132.

In some embodiments, the presenter interface 132 and the application 110 may have the same display resolution. In such a case, the computing server 110 may not need to perform the transformation of coordinates.

Since the transformation of event coordinates is used for the presenter interface 132 and the server-side application 112 is used to display and stream content, the network conferencing system provides a cross-platform solution where the presenter and the viewers can all be on different types of tablets, desktop computers, laptops, etc. with different screen sizes and resolutions. Also, since the content session is operated at the computing server 110, the presentation is not limited by the device environment of the presenter client device 130. For example, conventionally, if a presenter is using a tablet to make the presentation using screen sharing, the presentation material is limited to what is compatible with the tablet. In contrast, in various embodiments described herein, the presenter client device 130 may be running a first operating system while the computing server 110 may be running a second operating system. The presenter may make the presentation through the second operating system of the computing server 110. For example, a presenter holding a smartphone can make the presentation by remotely controlling a full-function desktop operated at the computing server 110. The presentation is also not limited by the capacity of the presenter client device 130.

Example Processes

Figure 7:
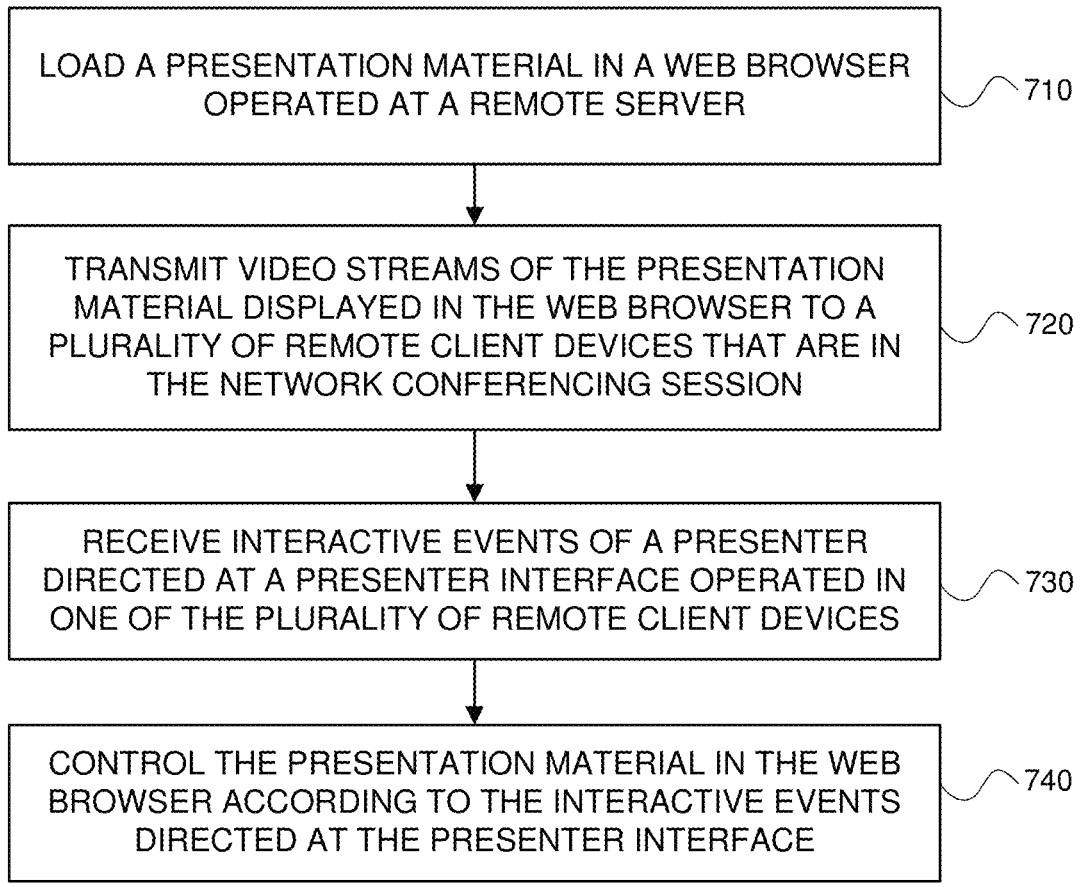
FIG. 7 is a flowchart depicting a process for holding a network conferencing session, in accordance with some embodiments.

FIG. 7 is a flowchart depicting a process 700 for holding a network conferencing session, in accordance with some embodiments. The process 700 may be performed by the computing server 110. The computing server 110 may load 710 a presentation material in a content renderer. A web browser may be an example of the application 112 and may be operated at the computing server 110. The computing server 110 may transmit 720 video streams of the presentation material displayed in the content renderer to a plurality of remote client devices that are in the network conferencing session. The computing server 110 may receive 730 interactive events of a presenter directed at a presenter interface 132 operated in one of the remote client devices. The presenter interface 132 is in communication with the computing server 110 and displays the presentation material based on data of one of the video streams The computing server 110 may control 740 the presentation material in the content renderer according to the interactive events directed at the presenter interface 132.

Figure 8:
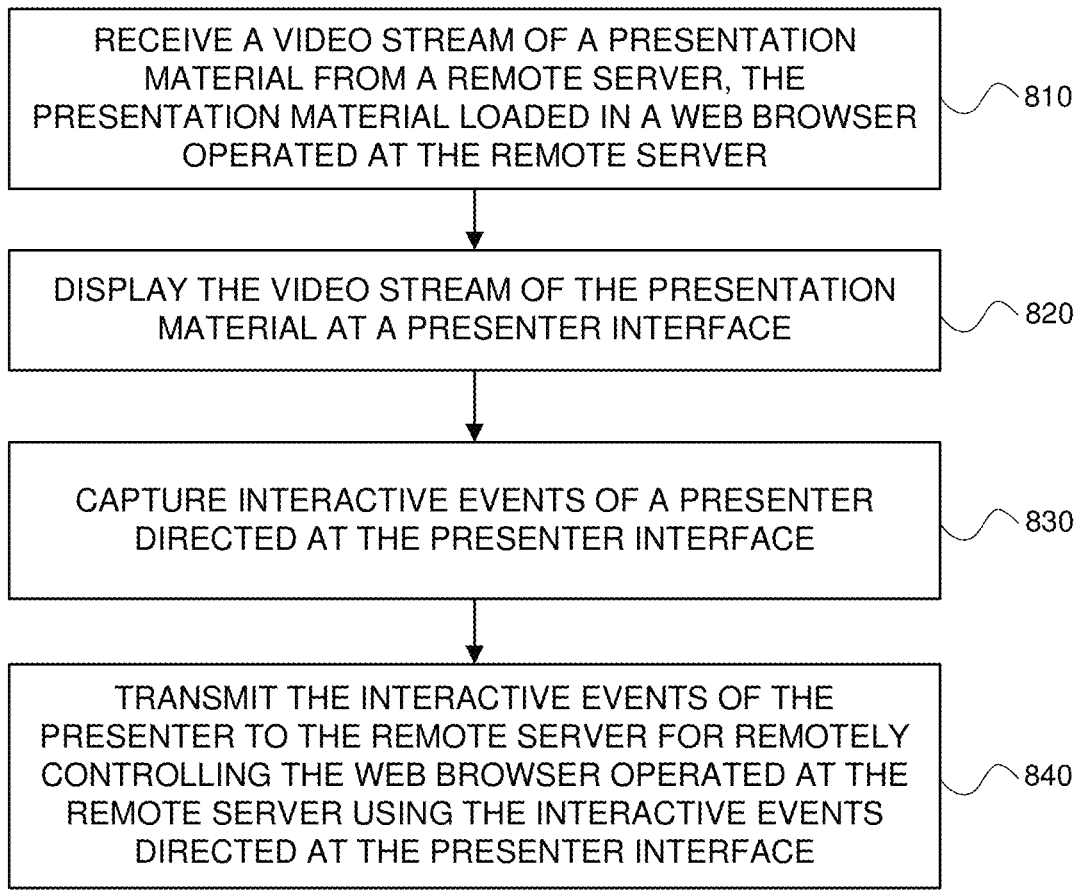
FIG. 8 is a flowchart depicting a process for providing a presentation through a presenter interface, in accordance with some embodiments.

FIG. 8 is a flowchart depicting a process 800 for providing a presentation through a presenter interface 132, in accordance with some embodiments. The process 800 may be performed by a presenter client device 130 such as using a presenter interface 132. The presenter client device 130 may receive 810 a video stream of a presentation material from a remote server, such as the computing server 110. The presentation material is loaded in a content renderer operated at the remote server that transmits video streams to a plurality of remote client devices that are in the network conferencing session. A web browser may be an example of the content renderer used as the application 112. The presenter client device 130 may display 820 the video stream of the presentation material at a presenter interface 132. The presenter client device 130 may capture 830 interactive events of a presenter directed at the presenter interface 132. The presenter client device 130 may transmit 840 the interactive events of the presenter to the remote server for remotely controlling the content renderer operating at the remote server using the interactive events directed at the presenter interface 132.

Computing Machine Architecture

FIG. 9 is a block diagram illustrating components of an example computing machine that is capable of reading instructions from a computer readable medium and execute them in a processor (or controller). A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIG. 1, including but not limited to, the client device 130 or 140, the computing server 110, and various engines, interfaces, terminals, and machines associated with those devices. While FIG. 9 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" and "computer" also may be taken to include any collection of machines that individually or jointly execute instructions 924 to perform any one or more of the methodologies discussed herein.

The example computer system 900 includes one or more processors 902 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 900 also may include a memory 904 that store computer code including instructions 924 that may cause the processors 902 to perform certain actions when the instructions are executed, directly or indirectly by the processors 902. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 902 and reduces the space required for the memory 904. For example, the architecture and methods described herein reduces the complexity of the computation of the processors 902 by applying one or more novel techniques that simplify the steps generating results of the processors 902, particularly for a processor of a client device that participates in a network conferencing session. The algorithms described herein may also reduce the size of the models and datasets to reduce the storage space requirement for memory 904, such as by reducing the burden on the presenter client device on streaming.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 900 may include a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The graphics display unit 910, controlled by the processors 902, displays a graphical user interface (GUI) to display one or more results and data generated by the processes described herein. The computer system 900 also may include alphanumeric input device 912 (e.g., a keyboard), a cursor control device 914 (e.g., a mouse, a trackball, a joystick, a motion sensor, or other pointing instrument), a storage unit 916 (a hard drive, a solid state drive, a hybrid drive, a memory disk, etc.), a signal generation device 918 (e.g., a speaker), and a network interface device 920, which also are configured to communicate via the bus 908.

The storage unit 916 includes a computer readable medium 922 on which is stored instructions 924 embodying any one or more of the methodologies or functions described herein. The instructions 924 also may reside, completely or at least partially, within the main memory 904 or within the processor 902 (e.g., within a processor's cache memory) during execution thereof by the computer system 900, the main memory 904 and the processor 902 also constituting computer readable media. The instructions 924 may be transmitted or received over a network 926 via the network interface device 920.

While computer readable medium 922 is shown in an example embodiment to be a single medium, the term "computer readable medium" should be taken to include a single medium or multiple media (e.g., a centralized or distributed database, or associated caches and servers) able to store instructions (e.g., instructions 924). The computer readable medium may include any medium that is capable of storing instructions (e.g., instructions 924) for execution by the processors (e.g., processors 902) and that cause the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

ADDITIONAL CONSIDERATIONS

Beneficially, the features associated with various embodiments described in this disclosure provide advantages over and solve many technical challenges of conventional network conferencing platforms. For example, by using a remote computing server to load a presentation material, the content of the material can be pre-approved by an organization to prevent confidential information from accidentally leaking in a presenter screen sharing. The use of a server-side application also increases the choices and interactivity of the content because non-linear webpage, multimedia content, and interactive tools can be incorporated into the presentation material in a cross-platform manner. The presentation is no longer limited by the capability of the presenter's device because the presentation material is not operated from the presenter's device. For example, a presenter may use a small cellphone to make a presentation that takes advantage of the full desktop capacity provided by the remote computing server.

Various embodiments described herein also address network and processing bandwidth issues often associated with conventional conferencing systems. For example, presentation conventionally is streamed from the presenter's device. This puts a significant burden on the presenter device's upload network bandwidth and CPU processing power. In various embodiments, the heavy loading video data may be streamed from a computing server. This alleviates the bandwidth burden on the presenter's device. The network connection between a server and each client device also separates the interconnection among the client devices and allows the server to tailor and allocate network bandwidth based on individual client device's conditions.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system for holding a network conferencing session, the system comprising:
   a remote server comprising memory and one or more processors, the memory configured to store computer code comprising instructions, wherein the instructions, when executed by the one or more processors, cause the one or more processors to:
      load a presentation material in a content renderer operated at the remote server, and
      transmit video streams of the presentation material displayed in the content renderer to a plurality of remote client devices that are in the network conferencing session, the plurality of remote client devices including a presenter device associated with a presenter and a viewer device associated with a viewer; and
   a presenter interface in communication with the remote server, the presenter interface operated in the presenter device, the presenter interface configured to:
      receive one of the video streams of the presentation material,
      display the presentation material based on data from the one of the video streams,
      output, while the presentation material is displayed, representations of (1) video that is captured by the viewer device and of the viewer and (2) audio that is captured by the viewer device and of the viewer,
      capture interactive events of the presenter directed at the presenter interface, and
      transmit the interactive events of the presenter to the remote server for remotely controlling the content renderer operated at the remote server using the interactive events directed at the presenter interface.

2. The system of claim 1, further comprising:
   a viewer interface in communication with the remote server, the viewer interface operated in the viewer device, the viewer interface configured to display the presentation material for the viewer and output representations of (1) video that is captured by the presenter device and of the presenter and (2) audio that is captured by the presenter device and of the presenter.

3. The system of claim 2, wherein the presenter interface is in communication with the remote server using one of the video streams, an audio stream and a control data stream that transmits actions of the presenter to the remote server, and the viewer interface is in communication with the remote server without the control data stream.

4. The system of claim 3, wherein a control data stream of the viewer interface is activatable to switch the viewer interface to a new presenter interface.

5. The system of claim 3, wherein only one control data stream among the plurality of remote client devices is in communication with the remote server during the network conferencing session.

6. The system of claim 1, wherein the presentation material includes a file in HTML format that is loaded into the content renderer.

7. The system of claim 1, wherein the presentation material includes an interactive element and a multimedia content.

8. The system of claim 1, wherein the presentation material displayed at the presenter interface is in a first display resolution and the content renderer operated at the remote server is in a second display resolution different from the first display resolution.

9. The system of claim 8, wherein the remote server is further configured to:
   receive a particular interactive event performed at the presenter interface at a first coordinate relative to the first display resolution operated at the presenter interface,
   transform the first coordinate to a second coordinate relative to the second display resolution operated at the content renderer, and
   replay the particular interactive event in the content renderer using the second coordinate.

10. The system of claim 1, wherein the presentation material displayed in the plurality of remote client devices has a display resolution that is customizable by each of the remote client devices.

11. The system of claim 1, wherein the interactive events of the presenter include at least one of a mouse action, a keyboard action, or a touch action.

12. The system of claim 1, wherein the presentation material is a pre-approved content retrieved from a repository.

13. The system of claim 1, wherein a bandwidth of a video stream displayed in each of the plurality of remote client devices is different and is based on a network connection between the remote client device and the remote server.

14. The system of claim 1, wherein the presenter interface is embedded in a third-party communication platform.

15. The system of claim 1, wherein the video stream is established by WebRTC.

16. A computer-implemented method for holding a network conferencing session, the computer-implemented method comprising:
   loading a presentation material in a content renderer operated at a remote server;

transmitting video streams of the presentation material displayed in the content renderer to a plurality of remote client devices that are in the network conferencing session;

receiving interactive events of a presenter directed at a presenter interface operated in a first remote client device from the plurality of remote client devices, the presenter interface being in communication with the remote server and displaying (1) the presentation material based on data of one of the video streams, (2) a representation of video captured by a second remote client device from the plurality of remote client devices, and (3) a representation of audio captured by the second remote client device; and controlling the presentation material in the content renderer according to the interactive events directed at the presenter interface.

17. The computer-implemented method of claim 16, wherein the presentation material displayed at the presenter interface is in a first display resolution and the content renderer operated at the remote server is in a second display resolution different from the first display resolution.

18. The computer-implemented method of claim 17, further comprising:

receiving a particular interactive event performed at the presenter interface at a first coordinate relative to the first display resolution operated at the presenter interface, transforming the first coordinate to a second coordinate relative to the second display resolution operated at the content renderer, and replaying the particular interactive event in the content renderer using the second coordinate.

19. The computer-implemented method of claim 16, wherein the presentation material is a pre-approved content retrieved from a repository.

20. A non-transitory computer readable medium configured to store computer code comprising instructions, wherein the instructions, when executed by one or more processors, cause the one or more processors to:

receive a video stream of a presentation material from a remote server, the presentation material loaded in a content renderer operated at the remote server that transmits video streams to a plurality of remote client devices that are in a network conferencing session;

display the video stream of the presentation material at a presenter interface;

output, while displaying the video stream of the presentation material at the presenter interface, representations of at least one of (1) video that is captured by the plurality of remote client devices and (2) audio that is captured by the plurality of remote client device;

capture interactive events of a presenter directed at the presenter interface; and transmit the interactive events of the presenter to the remote server for remotely controlling the content renderer operated at the remote server using the interactive events directed at the presenter interface.

* * * * *